United States Patent
Herman et al.

[15] 3,703,005
[45] Nov. 14, 1972

[54] RADAR SIGNAL PHASE CORRECTION

[72] Inventors: Elvin E. Herman, Los Angeles; Vernon W. Lym, Torrance; Henry L. McCord, Los Angeles, all of Calif.

[73] Assignee: Hughes Aircraft Company, Culver City, Calif.

[22] Filed: June 21, 1965

[21] Appl. No.: 465,792

[52] U.S. Cl. ................................................343/17.1
[51] Int. Cl. .............................G01s 7/28, G01s 9/02
[58] Field of Search...................343/5 DP, 7.7, 17.1, 9

Primary Examiner—Malcolm F. Hubler
Attorney—James K. Haskell and Robert Thompson

EXEMPLARY CLAIM

19. In a radar circuit of the type including a transmitter section having a circuit for generating and transmitting pulsed rf oscillatory signals, a receiver section having a circuit for detecting echo signals, the combination therewith of: a means for generating a clock reference signal; means coupled to receive a portion of the pulsed rf oscillator signals generated by the transmitter and coupled to receive the clock reference signal for detecting phase differences between the transmitted signal and the clock reference signal and for generating an error signal that is proportional to a function of the detected phase differences therebetween; means coupled to receive the error signal for storing the received error signal during the interpulsed period between transmitted pulse signals; a stable local oscillator means in the receiving section for generating a c-w output signal; phase shifter means coupled to receive the stable local oscillator output signal and to receive the error signal for phase shifting the local oscillator output signal to remove phase variations in the local oscillator output signal relative to the transmitted signal resulting from rf starting phase variations in the transmitted pulses; and means for receiving the echo signals and for receiving the phase shifted local oscillator signals for producing a coherent echo signal.

19 Claims, 10 Drawing Figures

RADAR SIGNAL PHASE CORRECTION

This invention relates generally to an improvement in radar systems and relates more particularly to a means and a method for increasing the degree of coherence of radar receiver output signals.

Conventional radar systems transmit pulses of rf carrier energy and receive energy reflected from an object located within the path of the transmitted energy. Since the reflected energy is an echo of the transmitted energy, its rf phase is dependent upon the phase of the rf energy at the initiation of the transmitted pulse and upon the time required for the energy to travel from the radar, to the reflecting object, and back.

For example, if a magnetron were to be used for a transmitter oscillator, its operating characteristics are such that the first rf cycle of each main bang transmitted pulse may begin at any phase from 0° to 360° of a full rf cycle. The reflected signal returns to the radar system with a time delay equal to the distance from the radar to the reflecting object and back to the radar divided by the propagation velocity of the pulse energy. Since the total phase of the reflected signal is relative to that of the magnetron transmitter phase, the pulse-to-pulse phase variations in the magnetron can affect the phase coherence of the reflected energy by as much as one full rf cycle for each received echo signal, thereby deteriorating the usefulness of the video signal information.

Accordingly, it is an object of this invention to provide an improvement in radar systems in which provision is made to compensate for the effects of pulse-to-pulse phase variations of the transmitted rf carrier upon the reflected rf energy received by a radar system.

Another object is to provide a circuit in a system of the character referred to for continually referencing the phase of the transmitted rf main bang signal and the phase of the reflected rf echo signals received at the radar relative to a stable reference signal.

Still another object is to provide a means in a radar system for improving the usefulness of the video signals of a radar display circuit in a simple and novel manner.

Yet another object is to provide improvements in a conventional pulsed type of radar circuitry.

The above and other objectives of this invention can be accomplished by employing a radar system having a pulsed oscillator, such as the magnetron type, for the high power transmitter's rf source, and including in combination therewith, a circuit for achieving an equivalent phase coherency between the main bang transmitted rf signal and the corresponding received echo signals relative to a reference signal. The signal coherency circuit is featured by, a stable reference frequency signal generator (clock), a phase sensor means, a memory means, and an adjustable phase shifter means.

In operation, since the phase of the main bang rf output pulse is uncorrelated from pulse-to-pulse, each transmitted pulsed rf carrier is phase-compared against a stable reference frequency signal (clock). An error signal having an amplitude corresponding to the instantaneous phase error between the reference signal (clock) and the main bang rf pulse signal is generated at the phase detector for each transmitted main bang pulse. The corresponding error signal is stored in a memory means for one interpulse period and is applied to the phase shifter means to vary the phase of the highly stable reference signal (clock) accordingly. Thus, the reference signal phase is shifted without disturbing the basic stability of the reference signal generator. As a result, when an echo signal appears at the receiver output, it will have essentially no phase component corresponding to the random starting phase of the magnetron.

During each subsequent interpulse period a new error signal is generated which corresponds to the phase difference between the starting phase of the corresponding main bang rf carrier and the reference clock. By so utilizing the error signal, it is possible to achieve an equivalent of phase correcting each echo signal derived from each transmitted pulse to eliminate the effects of the random starting phase differences arising between the main bang rf signal and the reference signal (clock). Thus, the degree of coherence of the phase-corrected echo signals approaches that of the reference clock within the limits of the errors of phase measurement and correction.

Other objects, features, and advantages of this invention will become apparent upon reading the following detailed description of one embodiment and referring to the accompanying drawings in which.

Figure 1:
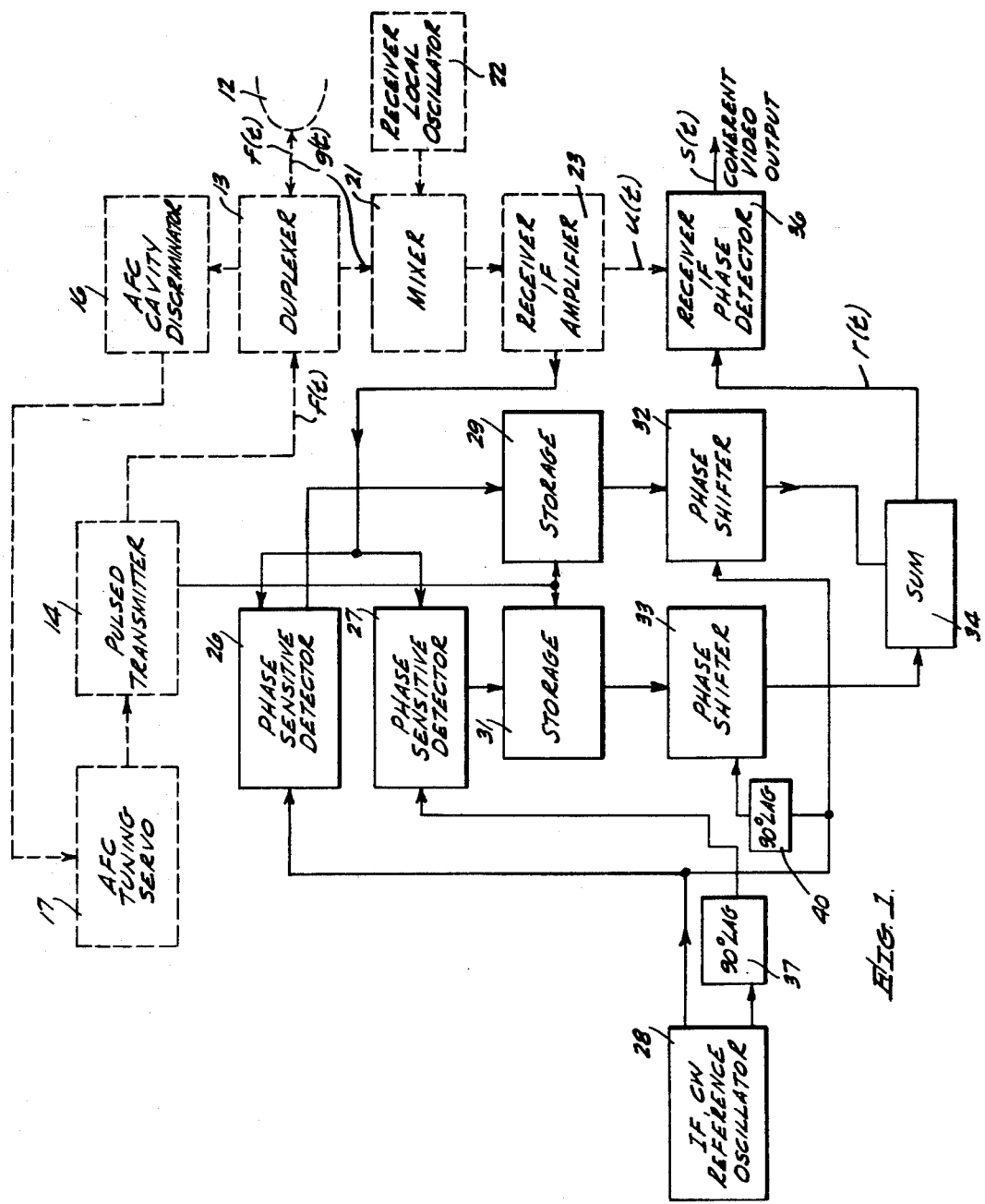
FIG. 1 is a block diagram illustrating a radar circuit in which the classical radar stages are shown in dotted line representation, and the phase correction circuit embodying the features of this invention is illustrated in solid line representation.

Referring now to the drawings, a conventional radar circuit is illustrated in dotted line representation in FIG. 1. Structurally, the radar circuit includes a transmitter section and a receiver section which are electrically isolated from one another and are alternately connected to an antenna 12 by means of a duplexer 13. A magnetron transmitter 14 may be maintained at a frequency with a fraction of a Mc of a prescribed nominal frequency by a feedback circuit including a cavity discriminator 16 that generates an output signal having an amplitude portional to frequency variations for controlling a tuning servo 17. The magnetron tuning servo develops an output to change the frequency of the magnetron transmitter 14. The result of this feedback circuit is to tune the magnetron frequency to essentially that of the cavity discriminator. It should be understood that the radar circuit is not limited to the radar illustrated but can be of any other classical design including klystron types.

In transmit operation, a main bang waveform (FIG. 2) of pulses of rf energy is generated by the magnetron transmitter 14 and fed through the duplexer 13 to the antenna 12 where the energy is radiated into space. This main bang waveform can be represented by the function:

$$(1) f_i(t) = A_i \cos(\omega_o t + \phi_i)$$

$\alpha \leq t \leq \tau$, and
0 at all other times
where:
$A_i$ = amplitude of $i^{th}$ pulse
$\omega_o$ = carrier frequency
$\phi_i$ = random phase variation (radians)

Figure 2:
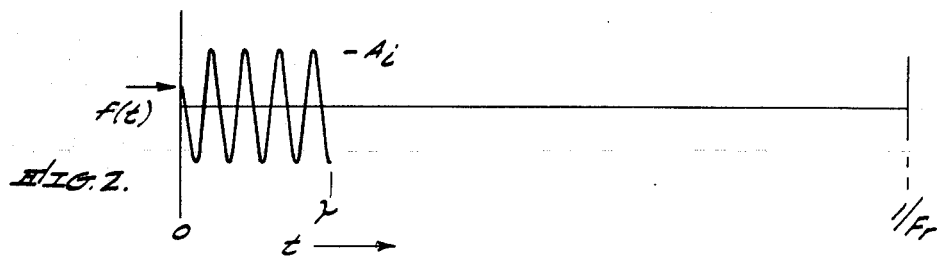
Figure 3:
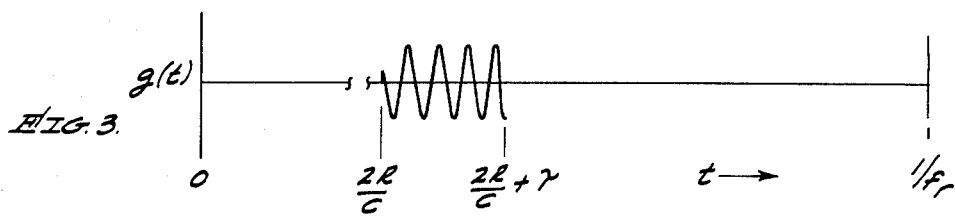
FIGS. 3–6 are graphs illustrating representative voltage waveforms for voltage signals generated within the circuit of FIG. 1.

It should be understood that the graphical waveforms are not the actual waveforms since FIG. 2 is merely intended to illustrate the random phase variation of $\phi_i$ of the rf carrier $\omega_o$ from pulse-to-pulse, and the resultant phase shift in the transmitted signal. Consequently, the graph and all subsequent graphs have been made as simple as possible and are merely representative of the actual waveforms. The rf carrier $\omega_o$ can, for instance, actually be in the x-band with a carrier of 9,375.0 Mc, have a pulse duration of from 0.5 microseconds to 0.15 microseconds, and an interpulse period of 5,000 microseconds. It should be understood that these need not be the actual values used and, in fact, they may not even be the best values. These values have only been selected in order to make the description as definite as possible.

Since the duplexer 13 does not provide perfect electrical isolation between the transmitter section and the receiver section, a portion of the transmitted energy leaks through the duplexer 13 and can be applied to a mixer 21. The mixer 21 combines or heterodynes the leakage signal with an rf signal from a stable local oscillator 22 to generate an IF signal. This IF signal can, for example, be about 30 Mc. The mixer 21 can be of any classical type used in conventional radar circuits. The local oscillator 22 must have sufficient short term stability to preserve phase coherence over the interpulse period. Thus, an IF signal is generated for each magnetron transmission pulse. A receiver IF amplifier stage 23 receives and amplifies the heterodyned IF output from the mixer 21 and feeds it to a phase-correcting circuit embodying the features of this invention.

Although the mixer 21 also heterodynes a modulated echo signal $g(t)$ at some later time $2R/c$ where:

$$(2) g(t) = k A_i \cos[\omega_o(t - (2R/c)) + \phi_i]$$

$(2R/c) \leq + \leq (2R/c) + \tau$; and 0 at all other times
where:
$c$ = propagation velocity
$k$ = attenuation factor
$R$ = one way range to target to generate a modulated IF echo signal and the IF amplifier 23 also amplifies this modulated IF echo signal, the operation of the phase-correcting circuit will be described first since then, the reason for phase-correcting the main bang IF signal to eliminate the $\phi_i$ random phase variation in the transmit signal can be better understood.

The phase-correcting circuit operates generally in the following manner. The main bang IF signal output from the IF amplifier 23 is phase compared, at two phase detectors 26 and 27 with the phases of two IF reference signals generated by a common c-w (clock) oscillator 28. One of these two reference signals is phased 90° with respect to the other by a 90° lag circuit 37. The resultant phase error signals from the phase detectors 26 and 27 are video pulses having amplitudes proportional to the sine and to the cosine of the phase difference between the compared signals and are stored in storage means 29 and 31, respectively, for the remainder of the interpulse period $1/f_r$. An advantage of this circuit is that the reference oscillator need only be at the nominal frequency of the transmitter.

Figure 4:
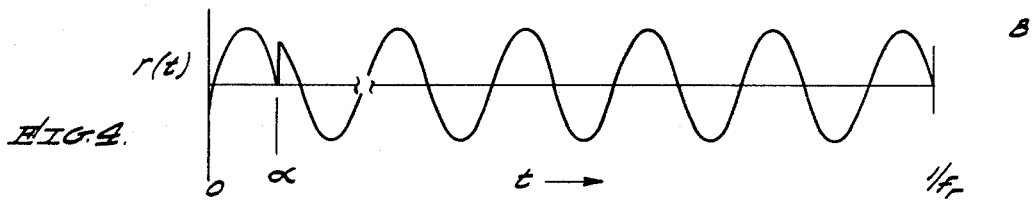

The stored voltage signals are each applied to an individual one of two phase shifter circuits 32 and 33 which operate to shift the phase of the two reference signals from the c-w (clock) oscillator 28 in proportion to the error voltages. One of these two reference signals is phase shifted 90° with respect to the other by a second 90° phase lag circuit. These reference signal outputs from the phase shifters 32 and 33 are summed or added together at a summing circuit 34 and the resultant phase-shifted IF signal $r(t)$ of FIG. 4:

$$(3) r(t) = B \cos[\omega_{IF}(t - \alpha) + \phi_i]$$

$\alpha \leq t \leq 1/fr$; 0 at all other times
where:
$B$ = amplitude of phase-corrected IF reference
$\omega_{IF}$ = IF frequency (30 Mc)
$\alpha$ = time required to phase sense and phase correct
$\phi_i$ = main bang carrier phase variation is applied to a receiver phase detector 36 at the receiver output. Thus, the phase of the reference signals will be continually adjusted once each interpulse period to correspond to random phase variations $\phi_i$ in the transmitted rf carrier of the magnetron. As a result, when the corresponding echo signal is received it will be coherent with the phase-shifted IF reference.

The advantages of phase-correcting the IF reference signal $r(t)$ for each transmitted pulse $f_i(t)$ will now be explained. As previously discussed, the characteristic operation of a magnetron transmitter is such that the initial phase $\phi_i$ of the rf carrier $\omega_o$ varies in a random manner from pulse to pulse. That is, the main bang signal $f_i(t)$ could be described by the mathematical function:

$$f_i(t) = A_i \cos(\omega_o t + \phi_i) \quad (1)$$

When the main bang energy is reflected from an isolated point reflector, the resultant received echo signal $g(t)$ has a carrier signal substantially identical to the above function except with a time delay and an amplitude decrease due to energy losses during transmission and reflection:

$$g(t) = k A_i \cos[\omega_o(t - 2R/c + \phi_i)] \quad (2)$$

In other words, the echo signal arrives at the antenna 12 after a time delay equal to the propagation velocity $(c)$ of the energy divided into the two-way distance $(2R)$ from the antenna to the reflecting point.

Figure 5:
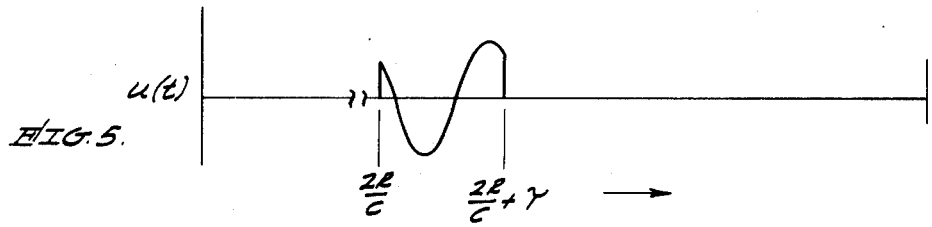

On receive, the duplexer 13 isolates the magnetron transmitter 14 from the antenna 12 and connects the receiver circuit to the antenna 12. Thus, the echo signal $g(t)$ is fed to the mixer 21 where it is heterodyned against the output signal of the local oscillator 22 to generate a modulated IF output signal having the same characteristic frequency of the phase-shifted IF c-w reference oscillator (30 Mc). The IF echo signal is then amplified by the IF stage amplifier 23 and applied to the phase detector 36 at the receiver output. Since the RF echo signal is substantially identical to the transmitted signal but with a time delay and change in amplitude, the IF echo signal $u(t)$ of FIG. 5 will be substantially in phase with the phase shifted IF c-w reference signal $r(t)$ applied to the other input of the detector 36 except for the phase component due to the time delay $2R/c$ and can be represented by the function:

(4)
$$u(t) = kA_i \cos\left[\omega_{IF}\left(t - \frac{2R}{c}\right) + \varphi_i\right] \quad \frac{2R}{c} \leq t \leq \frac{2R}{c} + \tau$$

and 0 at all other times

Figure 6:
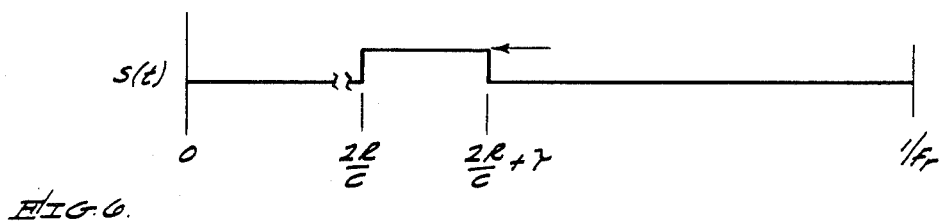

Since the phase of the IF reference signal is dependent upon the RF phase of the main bang pulse most recently transmitted, the output $s(t)$ (FIG. 6):

(5)
$$s(t) = r(t)u(t)$$
$$= k\frac{A_i B}{2} \cos \omega_{IF}\left(\frac{2R}{c}\right) - \alpha \quad \frac{2R}{c} \leq t \leq \frac{2R}{c} + \tau$$

and 0 elsewhere of the receiver IF phase detector 36 will be a pulse whose amplitude is uniquely related to the phase shift resulting from the time delay $2R/c$ but with essentially no amplitude dependence upon the random RF phase $\phi_i$ of the transmitter main bang output. Thus, the coherent video output of the phase detector 36 can be used to detect minute changes in the time delay from objects of interest since the RF phase variations from successive transmitter pulses are effectively removed in the output of the phase detector 36, leaving pulses whose amplitudes are essentially independent of the random transmitter RF phase variations.

Figure 7:
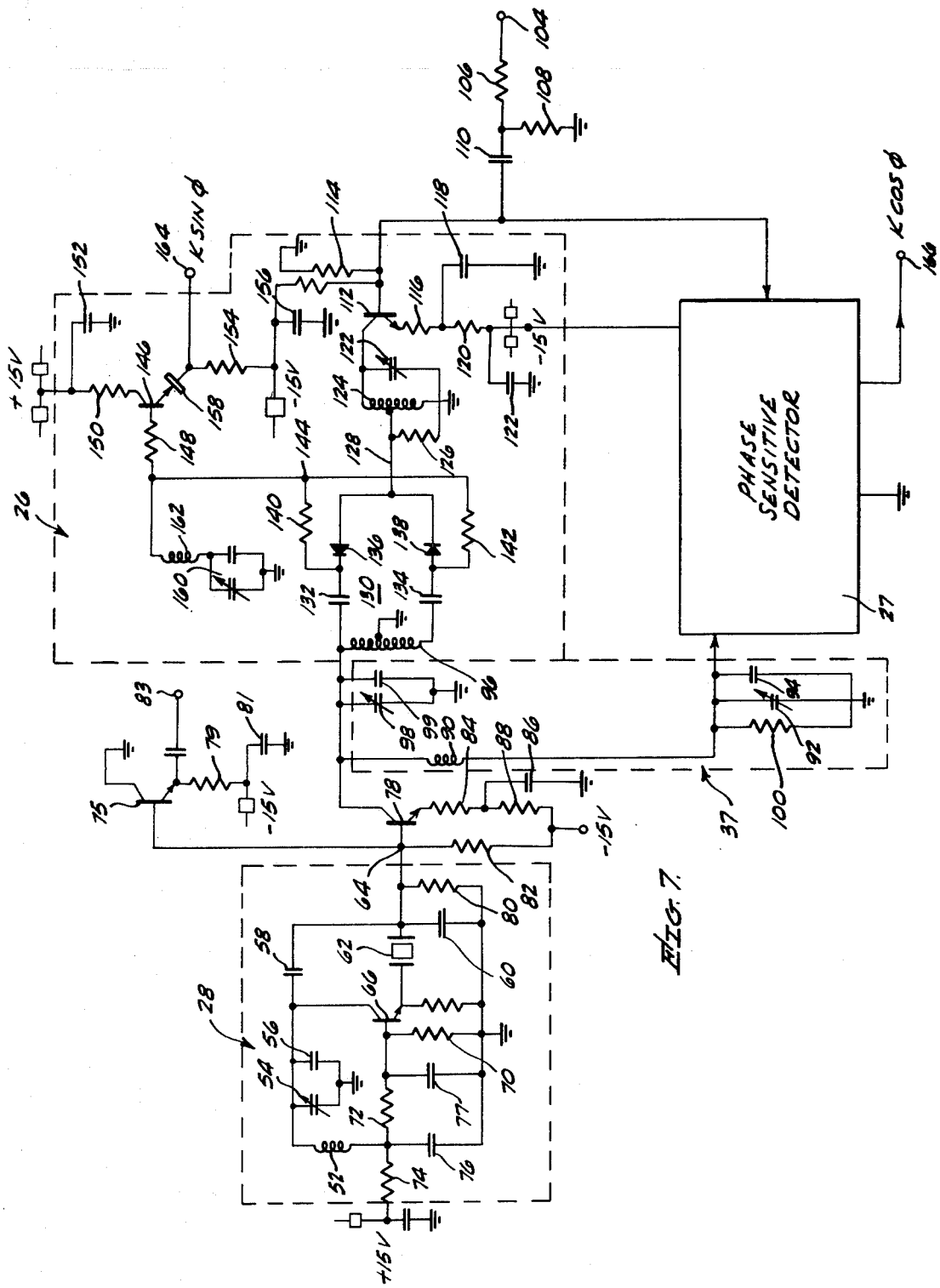
FIG. 7 is a schematic of a portion of the block diagram of FIG. 1 including the reference oscillators and the phase sensitive detectors.

Referring now to the details of the circuit, FIG. 7 is a schematic diagram of a portion of the block diagram of FIG. 1 illustrating the continuous wave reference oscillator 28, the 90° lag circuit 37, and the phase sensitive detectors 26 and 27.

The reference oscillator 28 or clock is a Colpitts oscillator having a tank circuit including an inductor 52 connected at one end with a parallel pair of capacitors 54 and 56 and with a series pair of capacitors 58 and 60. A crystal 62 is coupled from the junction of capacitors 58 and 60 and an oscillator output terminal 64 to feed back a 30 Mc signal to the emitter terminal of a transistor 66. In effect, the crystal 62 maintains the oscillator operating at 30 Mc. An emitter bias resistor 68 is connected between the emitter and a common terminal, whereas, base bias is provided by a resistor 70 connected between the common terminal and the base terminal of transistor and by a resistor 72 connected between an electrical power supply input resistor 74 and the base terminal. Bias capacitors 76 and 77 are connected to ac shunt the base resistors for keeping the base bias constant during oscillator operation. It should of course be understood that the frequency of the reference oscillator output is the same as the nominal frequency of the main bang leakage signal which is also applied to the phase sensitive detectors 26 and 27. In other words, if the main bang leakage signal is an rf signal, then the reference oscillator 28 must also be an rf oscillator of the same nominal frequency.

A 30 Mc reference signal is provided for use in the phase shifter stages of the circuit by feeding the reference oscillator output on line 64 to the base terminal of an emitter follower transistor 75. The 30 Mc output signal is developed across the emitter follower resistor 79 which is connected at one end to a terminal at a negative voltage and to ground through a bypass capacitor 81. The resultant 30 Mc output on terminal 83 can thereafter be used in the phase shifting circuit in a manner to be described in more detail later.

The 30 Mc c-w reference output from the reference oscillator 28 is processed into two 30 Mc signals which are shifted into phase quadrature with one another by the 90° phase lag circuit 37. In operation, the 30 Mc signal on output line 64 is applied to the base terminal of an emitter follower transistor 78 and amplified. The transistor 78 has a pair of base bias resistors 80 and 82 connected thereto. An emitter degeneration resistor 84 is connected from the emitter terminal to a common terminal through a bypass capacitor 86. An emitter bias resistor 88 is connected between a terminal at 15 volts dc relative to a common or ground terminal and the degeneration resistor 84. Hereafter, it should be understood that all voltage values are dc and relative to the common or ground terminal unless otherwise identified.

The amplified 30 Mc reference signal is divided into two circuit branches with one branch being fed to the phase sensitive detector 26 and the other branch being shifted or lagged 90° in phase relative to the first branch signal by the operation of the 90° phase lag circuit 37 and then applied to the phase sensitive detector 27.

In the 90° phase lag circuit 37, the 30 Mc reference input to the phase sensitive detector 27 lags 90° when fed through series inductor 90 and across the parallel pair of capacitors 92 and 94. In effect, the 90° phase shift circuit 37 can be thought of as a $\pi$ section equivalent of a double tuned transformer with the inductor 90 being connected across two transformer legs which include an input transformer 96 of the phase detector 26 and a similar input transformer (not shown) of the phase detector 27. The parallel pair of capacitors 98 and 99 provide 30 Mc tuning with the transformer 96 just as parallel pair of capacitors 92 and 94 provide 30 Mc tuning with an input transformer in the detector 27. In addition, a balance resistor 102 is connected in parallel across the parallel pair of capacitors 92 and 94 to balance the 30 Mc reference signal current flow in each leg of the double tuned transformer.

In addition to the 30 Mc c-w reference signals, a 30 Mc IF signal resulting from main bang leakage is also fed to the phase sensitive detectors 26 and 27. In operation, the main bang IF signal fed to input terminal 104 can be thought of as being a sine wave 30 Mc pulse train having a duration equal to the main bang pulse duration and a starting phase corresponding to the starting phase of the main bang rf signal. This main bang leakage IF signal is fed through a series input resistor 106 and across an input load resistor 108 to develop a signal which is fed through a series coupling capacitor 110 to the base terminal of a common emitter transistor 112. The transistor 112 has a base bias resistor 114 connected from the base terminal thereof to a common terminal. A degeneration resistor 116 is connected from the emitter terminal to ground through a bypass capacitor 118. In addition, an emitter bias resistor 120 is connected in series from the degeneration resistor 116 to a terminal at −15 volts and to ground through a bypass capacitor 122. The collector output of transistor 112 is connected to a parallel tuned LC circuit including a capacitor 122 and an inductor 124 connected at one end to the collector terminal and at the other end to a common terminal, and a resistor 126 connected between a center tap on the inductor 24 and the common terminal. The value of these circuit components is chosen so that the parallel tuned circuit is tuned to a center frequency of 30 Mc. In addition, the gain of the amplifier transistor 112 is chosen so that the amplifier main bang IF (30 Mc) signal on output line 128 has a lower amplitude than the 30 Mc c-w reference signal.

The main bang IF signal applied to the other phase sensitive detector 27 is amplified in substantially the same manner by essentially the same amplifier circuit, just described and, as a result, the detail of this portion of the circuit is not described in detail.

A phase sensitive diode detector 130 is connected to receive the 30 Mc reference signal and the 30 Mc IF main bang leakage signal for generating dc pulse signals having amplitudes proportional to the sine of the phase difference between input signals fed to the phase sensitive detector 26 and a dc output pulse signal proportional to the cosine of the phase difference between input signals fed to the phase sensitive detector 27. In operation of the phase sensitive detector 26, the 30 Mc reference signal is divided into two circuit branches with one signal being applied directly to one branch of the diode detector 130 and through a capacitor 132 while the other signal is phase shifted 180° by the center tap input transformer 96 and is then applied to the other branch of the diode detector and through a capacitor 134. The 30 Mc main bang leakage IF signal is applied to one branch of the detector 130 through a diode 136 and is applied to the other branch of the detector through an oppositely polarized diode 138. The two input signals fed through the detector branch that includes capacitor 132 and diode 136 are summed by the summing resistor 140. The two input signals fed through the detector branch that includes capacitor 134 and diode 138 are summed at the summing resistor 142. In effect, the high amplitude 30 Mc reference signal inputs cancel one another out at the junction 144 since the center tap input transformer has shifted one of them 180° in phase. The resultant output at summing junction 144 is a dc pulse having an amplitude proportional to the sine phase difference between the IF reference signal input and the IF main bang leakage signal input.

This phase difference output pulse signal at junction 144 is applied to the base terminal of an emitter follower transistor 146 through a base loading resistor 148. The transistor 146 has a collector bias resistor 150 connected to a terminal at +15 volts and to a bypass capacitor 152 which is in turn connected to a common terminal at the other end. An emitter load resistor 154 is connected to a terminal at −15 volts and to a bypass capacitor 156 which is in turn connected to a common terminal at the other end thereof. In addition, the emitter terminal has a bead of ferrite material 158 secured therearound which acts as an rf choke. A 30 Mc trap including a parallel pair of capacitors 160 connected between a common terminal and in series with an inductor 162 is connected to the summing junction 144 and traps any 30 Mc leakage signal.

Figure 8:
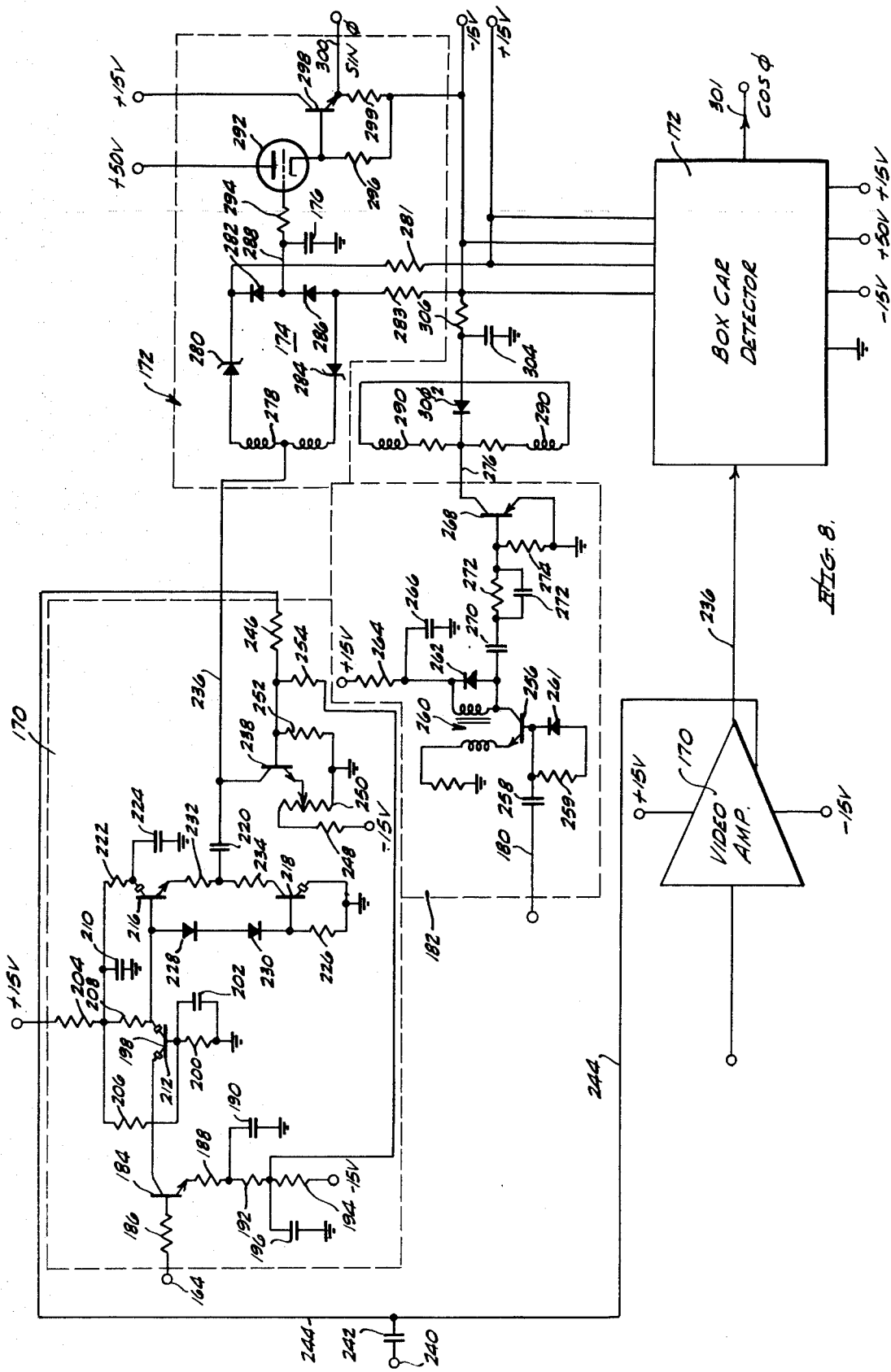
FIG. 8 is a schematic of a portion of the block diagram of FIG. 1 including the storage circuits in boxcar detector form.

The sine $\phi$ phase difference signal and the cos $\phi$ phase difference output signal pulse from the phase sensitive detectors are fed to the storage circuit of FIG. 8 at input terminals 164 and 166, respectively. The storage circuit of FIG. 8 includes two parallel branches each including a video amplifier 170 which feeds an amplified signal to a boxcar detector 172 having a diode gate 174 connected so that a storage capacitor 176 samples the instantaneous amplitude of the phase difference signal for very short duration at a select pulse portion during the pulse duration, as determined by a gate pulse applied to the input terminal 180 of a pulse forming circuit 182 from the radar circuit.

In operation, the sine $\phi$ phase difference signal is applied to the base terminal of a common emitter transistor 184 in the first stage of a cascode amplifier in the video amplifier 170 through an input impedance resistor 186. The emitter terminal of transistor 184 is ac coupled to ground through a low resistance degeneration resistor 188 and a bypass capacitor 190. An emitter bias resistor 192 is connected from the degeneration resistor 188 to a decoupling filter including a resistor 194 coupled to a terminal at a −15 volts and a capacitor 196 coupled to a common terminal.

The collector output of transistor 184 is applied to the emitter terminal of a second cascode amplifier stage which includes common base transistor 198. This common base transistor 198 has a base bias resistor 200 connected at one end to ground and with a capacitor 202 shunted thereacross. Base bias is provided to the base terminal through voltage divider resistors 204 and 206 connected in series between a terminal at +15 volts and the base terminal. A collector load resistor 208 is connected to the junction of voltage divider resistors 204 and 206. In addition, a bypass capacitor 210 is connected from the junction of the voltage divider resistors 204 and 206 to a common terminal to form a decoupling filter. Ferrite beads 212 and 214 are connected to the emitter terminal and to the collector terminal of the transistor 198 and act as rf chokes.

The collector terminal output of transistor 198 is fed to the base terminals of a complementary symmetry stage having emitter follower transistors 216 and 218 which conduct the amplifier bipolar phase difference signal sine $\phi$ through a coupling capacitor 220. Collector bias is applied to common emitter transistor 216 through a resistor 222 connected in circuit with a capacitor 224 which has the other end connected to a common terminal. The collector terminal of common emitter transistor 218 is connected to the common terminal. In addition, the collector terminals have ferrite beads connected thereto which operate as rf chokes. Base bias is provided for the transistor 216 by the resistors 204 and 208, and base bias is provided for the transistor 218 by a resistor 226 connected at one end to the common terminal. A pair of diodes 228 and 230 are connected in series between the base terminals of the complementary symmetry transistors 216 and 218 so that transistor 216 conducts positive polarity signals through an emitter load resistor 232 and the transistor 218 conducts negative polarity signals through an emitter load resistor 234.

To ensure that the output line 236 leading to the boxcar detector is clamped at a constant dc reference potential to overcome the possible effects of long term charge-up of the circuit components, a normally OFF transistor switch 238 is turned on and then turned off a short time before the phase difference pulse signal is conducted through the coupling capacitor 220, whereby a dc reference potential is restored on the output line 236. In operation, the clamping pulse is applied to the base terminal of the normally OFF transistor 238 from an input terminal 240 through a coupling capacitor 242, via a line 244, and through a base bias resistor 246. The dc reference level on output line 236 is thus set through the transistor 238 by a voltage divider including resistors 248 and 250 connected in series between a negative voltage terminal and common terminal. The emitter terminal of normally OFF transistor 238 is connected to the voltage divider resistor 250 which can be adjusted to set the reference voltage. Base bias is provided for the transistor 238 by a resistor 252 having one end connected to the common terminal. Base bias is also provided through resistor 254 connected from the base terminal to a common terminal through the bypass capacitor 196.

The output signal from the video amplifier 170 is applied to a diode gate 174 in the boxcar detector 172 wherein, after a predetermined time delay, a portion of the phase difference pulse signal is sampled and stored on a storage capacitor 176. The sampling operation is controlled by a synchronized sampling pulse applied to the input terminal 180 of a pulse shaping circuit 182 from the radar transmitter (FIG. 1), whereupon, very short duration gate pulse is applied to enable the diode gate 174 for the very short duration. In operation, this gate pulse is applied to the base terminal of a normally OFF transistor 256 of a blocking oscillator through a differentiating circuit including a capacitor 258 and a resistor 259. Any negative portion of the differentiating pulse is clipped by a diode 261 connected between the base terminal of the transistor 256 and a common terminal. The gate pulse turns on the transistor 256 whereby the regenerative feedback signal between the winding of transformer 260 connected to the emitter and to the collector is sufficient to saturate transistor 256. After a short duration of say, 0.1 microsecond from the initial turn-on, the regenerative feedback in the emitter winding and the collector winding of transformer 260 is sufficient to turn off the transistor 256. A diode 262 is connected in parallel across the collector winding of the transformer 260 to prevent ringing of the circuit. The diode 262 and the collector winding of transformer 260 are connected at one end to a bypass network including a resistor 264 which is connected at the other end to a +15 volt terminal and to a bypass capacitor 266 which is in turn connected at the other end to a common terminal. The output pulse from the blocking oscillator is fed to a common emitter inverter transistor 268 through a coupling capacitor 270 and a voltage divider network including resistors 272 and 274. A speed-up capacitor is shunted across the resistor 272 and the base terminal of inverter transistor 268 is connected to the junction of the voltage divider resistors 272 and 274. The resultant output on the collector terminal 276 is a square wave pulse having a duration of about 0.1 microsecond.

Referring now to the details of the boxcar detector 172, the output from the video amplifier 170 applied to the diode gate 174 at a center tap of an input transformer 278 is sampled and stored on capacitor 176. The one end of the transformer of diode gate 174 is connected to a circuit branch containing a Zener diode 280 which is back-biased and normally conducting and a diode 282 which is back-biased and normally off. The above bias of these diodes is attained through a resistor 281 connected from a +15 volt terminal to the junction of the Zener diode 280 and diode 282. The other end of the input transformer winding is connected to a branch including a Zener diode 284 which is polarized oppositely of the Zener diode 280 and is back-biased and normally ON and a back-biased normally OFF diode 286. Bias for these diodes is obtained through a resistor 282 connected from a terminal at −15 volts to the junction of the Zener diode 284 and diode 286. An output lead 288 is connected to the junction of the normally OFF diodes 282 and 286.

To sample and store the phase difference signal, the signal on input line 236 will be conducted on the storage capacitor 176 when a gating pulse is received from the gate pulse forming circuit 182 by the primary 290 of a pulse forming transformer which is in turn coupled to the input winding 278 of the diode gate.

In operation, the gating pulse applied to the primary winding 290 produces a magnetic coupling force which generates a corresponding signal across the secondary winding 278, causing the diodes 282 and 286 to be forward-biased. As a result, the sine $\phi$ phase difference input pulse signal on line 236 is transferred through the conducting diode and charges the storage capacitor 176. At the end of the 0.1 microsecond gating pulse, the diodes 282 and 286 are again back-biased, whereupon, the signal or charge stored on capacitor 176 is retained for the remainder of the interpulser period $1/f_r$. The signal stored on capacitor 176 is fed to the grid of a cathode follower 292 through a grid impedance resistor 294, whereupon, the output signal generated across the cathode follower resistor 296 is a dc signal and is applied to the base terminal of an emitter follower transistor 298. The cathode follower resistor and an emitter loading resistor 299 are connected to a negative voltage terminal, whereas, the collector terminal of transistor 298 is connected to a positive voltage terminal. Thus, the boxcar output signal on output line 300 is a dc signal proportional to the sine of the phase difference previously detected. The boxcar output signal on output line 301 from the other boxcar detector 172 in storage circuit 31 is also a dc signal but is proportional to the cosine of the phase difference previously detected.

When the pulse forming transformer is turned off, a diode 302, connected between the two primary windings 290, catches the back swing to prevent the circuit from oscillating. In addition, the diode 302 and the two ends of primary windings 290 are connected in common to a bypass circuit including a capacitor 304 which is connected at one end to a common terminal and a resistor 306 which is connected at one end to a terminal at −15 volts.

Figure 9:
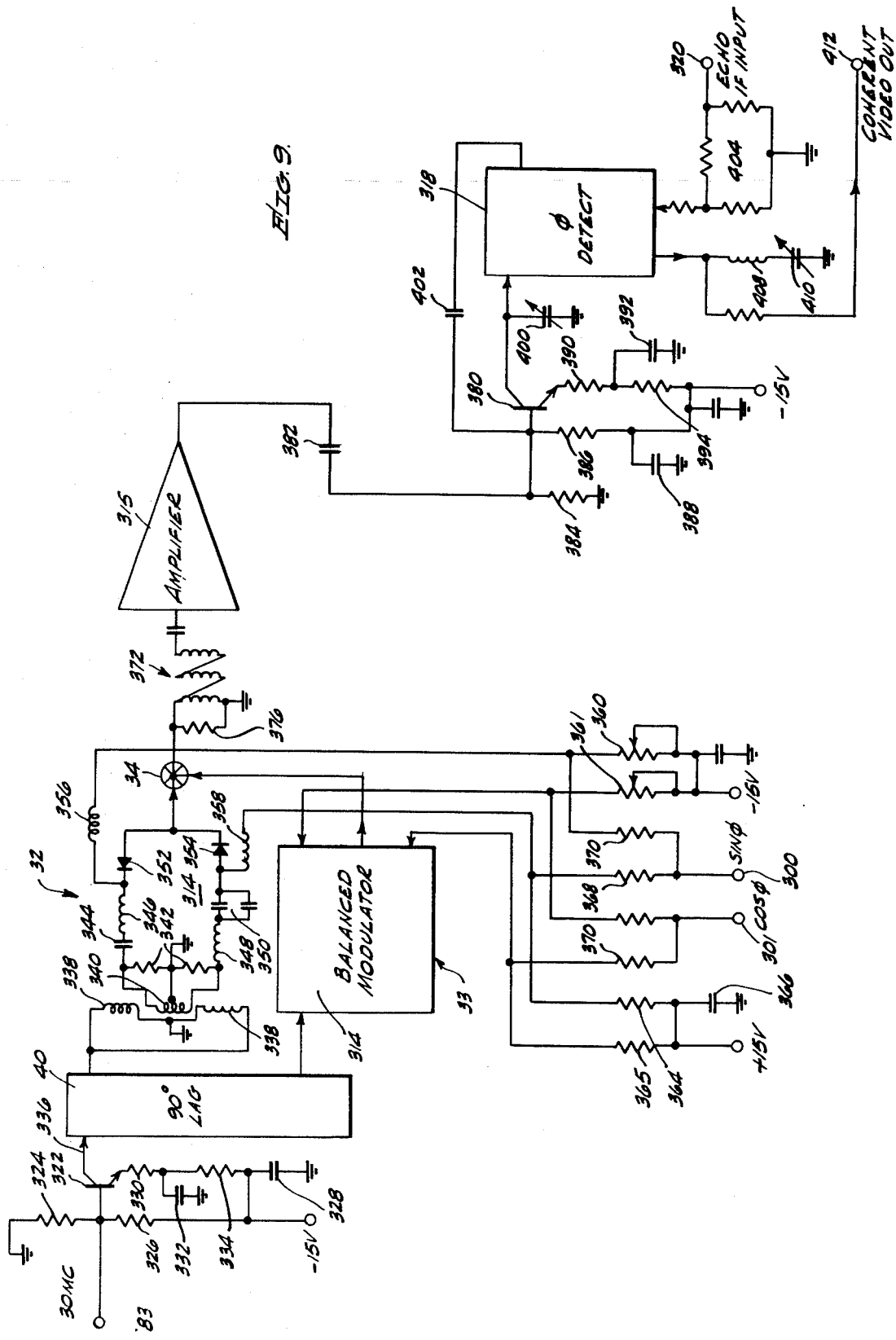
FIG. 9 is a schematic of a portion of the block diagram of FIG. 1 including the phase shifter, summing circuits, and receiver phase detector.

To phase shift the c-w IF reference signal to correspond to the random starting phase of the main bang leakage signal, the 30 Mc reference signal generated by oscillator 28, is applied to the input terminal 83 of the phase shifter circuits 32 and 33 schematically illustrated in FIG. 9, whereas, the sine $\phi$ phase shift signal from the boxcar 29 is applied to input terminal 300 and the cos $\phi$ phase shift signal from the boxcar 31 is applied to the input terminal 301. In operation, a pair of balanced modulators 314 each modulate a separate one of the two phase difference signals against the phase quadrature c-w reference signal wherein the resultant output signal is summed at a summing junction 34 amplified through a transformer and amplifier 315, phase detected at phase sensitive detector 318 to generate a coherent video output signal at output terminal 320.

In operation, the 30 Mc c-w reference signal is applied to the base terminal of a common emitter amplifier transistor 322 from the input terminal 83. The amplifier transistor 322 is base biased through voltage dividing resistors 324 connected to ground and 326 connected to a terminal at −15 volts and ac coupled to a common terminal from the negative terminal through a bypass capacitor 328. An emitter degeneration resistor 330 is ac connected to ground at one end through a bypass capacitor 332. Emitter bias is also provided through the emitter degeneration resistor 330 from a bias resistor 334 having one end connected to a terminal at −15 volts.

The amplified output signal on the collector terminal 336 is applied to a 90° phase lag circuit 40. The 90° phase lag circuit 40 divides the amplified 30 Mc reference signal into two 90° out-of-phase reference signals or phase quadrature reference signals. Since the 90° phase lag circuit 40 is essentially identical to the phase lag circuit 37 illustrated in FIG. 7, it is not described in detail and is thus represented in block diagram form.

One output from the phase lag circuit 40 is applied to the balanced modulator 314 of phase shifter circuit 32 and is modulated against the sine $\phi$ phase shift signal from the associated boxcar circuit 172. The 90° phase shift output signal is applied to the balanced modulator 314 of phase shifter circuit 33 and is modulated against the cosine $\phi$ phase shift signal from the associated boxcar circuit 172.

Referring now to the details of the operation of balanced modulator 314, the 30 Mc input signal is applied to a split, center-tapped winding 338 to generate two 180° out-of-phase reference signals on a center-tapped secondary winding 340. Each half of the primary 340 has an impedance resistor 342 connected in parallel across it and to the center-tapped common terminal. Each branch of the balanced modulator includes a series tuned LC circuit including capacitor 344 and inductor 346 in one branch and inductor 348 and a pair of parallel capacitors 350 in the other leg. These series tuned LC circuits are each tuned to 30 Mc. Each series tuned circuit is connected to an output summing junction 34 through a diode 352 in one branch and oppositely polarized diode 354 in the other branch. These two diodes are biased so that they are normally on when zero volt sine $\phi$ input signal is applied to them through the chokes 356 and 358; or in other words, when the phase shift signal sine $\phi$ on input terminal 310 is zero volts. When, however, the diodes are biased by the input signals sine $\phi$ they conduct at different voltage levels.

The balanced modulator 314 illustrated in block diagram form also operates on the preceding general principle. Consequently, since the input 30 Mc input signal to modulator 314 for 90° out-of-phase to the input signal to modulator 314, the diodes conduct at different voltage levels, whereupon the total output signal to the summing junction 34 is a phase shifted 30 Mc sine wave. In other words, the signal at summing junction 34 is phase shifted $\phi$ radians, which correspond to the random rf starting phase of the main bang pulse.

Bias is provided for the diode 352 through the adjustable voltage dividers 360 and 361 for both balanced modulators 314. Bias is provided for the diode 354 in both modulators 314 by the resistors 364 and 365 which are connected at one end to a negative voltage and to a common terminal through a bypass capacitor 366. Impedance resistors 368 and 370 provide the voltage drop of the boxcar input signals on terminals 310 and 312 which vary the bias level on the diodes in each balanced modulator.

The phase shifted 30 Mc signal is amplified in a three-winding transformer 372 and is then applied to the amplifier 315 through a coupling capacitor 374. An impedance resistor 376 is shunted across the primary input winding of the transformer 372.

The amplifier 315 further amplifies the phase shifted IF reference signal to a usable level for a phase sensitive detector 318. The amplifier 315 is illustrated in block diagram form since it operates on the same general principle as the cascode amplifier portion of the video amplifier 170 illustrated in FIG. 8, with the exception that the complementary symmetry circuit is replaced with a conventional common emitter transistor stage.

The 30 Mc phase shifted signal is applied to the base terminal of a common emitter transistor 380 through a coupling capacitor 382 where it is further amplified. Base bias is provided through a resistor 384 connected to ground and a resistor 386 which is ac connected to ground through a bypass capacitor 388. An emitter degenerator resistor 390 is connected to ground through a bypass capacitor 392. Emitter bias is provided for transistor 380 through an emitter bias resistor 394. This amplified 30 Mc phase shifted signal developed on the collector terminal is applied to the phase sensitive detector 318 where it is phase compared with the IF echo signal received on input terminal 320.

Phase sensitive detector 318 operates on substantially the same principle as the phase detector 130 illustrated in FIG. 7 and thus is illustrated in block diagram form. In operation, a variable capacitor 400 is used to tune the input winding to 30 Mc. In addition, a feedback capacitor 402 is connected from the detector to the base terminal of the common emitter transistor 380 to eliminate the Miller effect therein. In operation, the 30 Mc echo signal is applied to the detector 318 through an impedance matching $\pi$ network 404. The output terminal 406 of phase sensitive detector 318 is connected across a 30 Mc trap including an inductor 408 and a capacitor 410, wherein the resultant output terminal 412 of the phase sensitive detector 318 is a video pulse having a variable amplitude dependent upon the phase difference between the phase shifted reference signal and the IF echo signal. Since the reference signal has been phase shifted to correspond to the random starting phase of the main bang pulse its phase relationship to the echo signal will be constant except for the two-way time delay $2R/c$ between the antenna and the target. Thereafter, the coherent video output can be further amplified and processed for a conventional video display.

Figure 10:
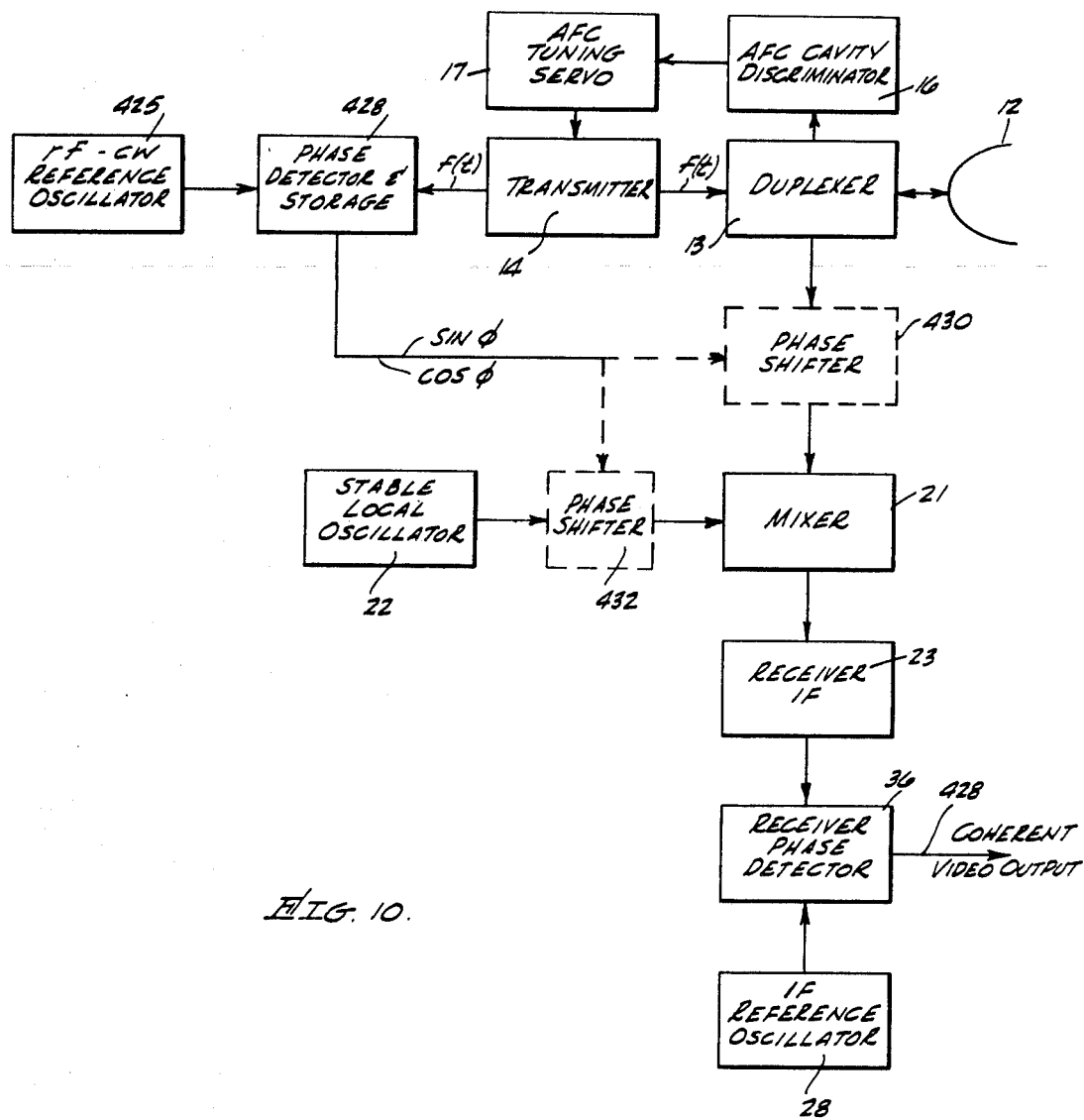
FIG. 10 is an embodiment utilizing the principles of the invention.

Another embodiment illustrated in FIG. 10 is arranged to compare the random starting phase variation $\phi$ between the main bang rf signal and c-w reference signal (clock) generated by a reference oscillator 425 operating at the same rf level of the transmitter 17. The operation of the radar transmitter portion is substantially identical to the operation of the corresponding portions of the preceding embodiment illustrated in FIG. 1. That is, the transmitter 14 generates a main bang pulse $f(t)$. This main bang pulse $f(t)$ is conducted through the duplexer 13 and radiated into space by the antenna 12. The transmitter 14 is maintained to within a fraction of a Mc of a predetermined rf frequency by an afc feedback loop including the cavity discriminator 16 and the tuning servo 17 connected to correct the frequency of the transmitter output signal.

Referring now to the phase correction portion of the circuit, the main bang rf signal from the transmitter 14 is phase compared with the c-w reference signal from the reference oscillator in a phase detector and storage circuit 428. The reference oscillator 425 operates in substantially the same manner as the reference oscillator 28 schematically illustrated in FIG. 7, except that it is set to operate in the rf frequency of the transmitter 14.

The phase detector and storage circuit 428 operate in substantially the same manner as the phase sensitive detector and the storage circuit illustrated in FIGS. 7 and 8, in that the main bang signal and the reference signal (clock) are phase detected in phase quadrature, whereupon a sine $\phi$ and a cosine $\phi$ phase difference signal are generated and applied to a phase shifter 430 or to a phase shifter 432. It should be understood that if phase shifter 430 is used, phase shifter 432 is omitted, and the local oscillator is connected directly to the mixer 21. Conversely, if the phase shifter 432 is used, phase shifter 430 is omitted, and the duplexer 13 is connected directly to the mixer 21.

The phase shifters 430 and 432 operate on substantially the same principle as the phase shifters illustrated in FIGS. 1 and 9, except that they are set to operate at the rf level. In addition to this phase shifter, it is practical, under certain circumstances, to use a ferrite modulator of the type described in U.S. Pat. No. 3,084,295, issued on Apr. 2, 1963, to H. A. Rosen and entitled "Ferrite Modulators for Deviating Magnetrons" for the phase shifters 430 and 432.

Referring now to the operation of the phase shifter 430, the sine $\phi$ and the cosine $\phi$ phase difference error signals are applied to the phase shifter 430 for the inter-pulse period. As a result, when the echo signal $g(t)$ is received and conducted through the duplexer 13 to the phase shifter 430, the phase shifter 430 operates to phase shift the echo signal in accordance with the amplitudes of the phase difference error signals sine $\phi$ and cosine $\phi$. Since the amplitudes of the sine $\phi$ and cosine $\phi$ signals are dependent upon the random rf starting phase variation $\phi$ of the main bang pulse, the echo signal $g(t)$ will be phase shifted so as to eliminate the random phase variation component $\phi$ in the echo signal. Thereafter, this operation is continually repeated for each subsequent main bang pulse, whereupon, no starting phase variation $\phi$ appears in the echo signal fed to the mixer 21.

Thus, when the signal from the stable local oscillator 22 is heterodyned against the echo signal in mixer 21, the resultant IF signal applied to the receiver IF stage 23 and the receiver phase detector 36 always has the same phase relative to an IF reference signal generated by the reference oscillator 28 except for phase variations due to the two-way time delay to the target $2R/c$. Consequently, the video output signal on terminal 428 has an amplitude that is proportional to phase variations due to variations in target range only and is thus a coherent video signal.

In the embodiment where phase shifter 430 is omitted, phase shifter 432 shifts the c-w output signal from the stable local oscillator 22 in accordance with the magnitudes of the phase difference error signals sine $\phi$ and cosine $\phi$ for shifting the phase of the local oscillator output signal to remove phase variations in the local oscillator output relative to the main bang signal resulting from rf starting phase variations in the main bang pulses. As a result, when the echo signal $g(t)$ is fed to the mixer 21, it is heterodyned against a stable local oscillator signal which is phase shifted to eliminate the random starting phase variation $\phi$ relative to the corresponding echo signal. Consequently, the IF output signal fed to receiver IF stage 23 and receiver phase detector 36 has no random phase variation component $\phi$ and, thus, always has the same relative phase relationship to the IF clock signal from reference oscillator 28 except for those phase variations resulting from the two-way time delay to the target $2R/c$.

In addition, the principles of the phase correction technique can also be utilized in other combinations such as: phase detecting and measuring at the rf frequencies and phase shifting the echo signal at the IF frequencies; and phase detecting and measuring at the IF frequencies; and phase shifting the echo signal at IF frequencies.

Since the receiver stage components are substantially identical to the receiver stage components illustrated in FIG. 1, they are given the same reference characters throughout, and thus, are not described in detail.

While salient features have been illustrated and described with respect to a particular embodiment, it should be readily apparent that modifications can be made within the spirit and scope of the invention, and it is therefore not desired to limit the invention to the exact details shown and described.

What is claimed is:

1. In a radar circuit of the type including a transmitter section having a circuit for generating and transmitting a pulsed rf oscillating signal, a receiver section having a circuit for receiving and detecting echo signals, and means for connecting the transmitter section to and the receiver section to an antenna means, the combination therewith of: a stable oscillator means for generating a reference signal; means coupled to receive a portion of the transmitter rf signals and coupled to receive the reference signal for measuring phase differences therebetween and generating an error signal proportional to a function of the measured phase differences; and means coupled to receive the reference signal and to receive the error signal for phase shifting the reference signal in proportion to the error signal for removing phase variation between the reference signal and the transmitted pulse resulting from starting phase variations in the transmitted signal whereby the reference signal is made coherent relative to each related echo signal.

2. In a radar circuit of the type including a transmitter section having a circuit for generating and transmitting a pulsed rf oscillating signal, a receiver section having a circuit for receiving and detecting echo signals, and means for connecting the transmitter section to and the receiver section to an antenna means, the combination therewith of: a means for generating a clock reference signal; means coupled to receive a portion of the transmitter rf signals and coupled to receive the clock reference signal for detecting phase differences between the transmitted signal and the clock reference signal and for generating an error signal that is proportional to a function of the detected phase differences therebetween; and means coupled to receive the reference signal and to receive the error signal for phase shifting the reference signal in proportion to the error signal for removing phase variation between the clock reference signal and the transmitted pulse resulting from starting phase variations in the transmitted signal whereby the reference signal is made coherent relative to each related echo signal.

3. In a radar circuit of the type including a transmitter portion having a circuit for generating and transmitting main bang pulses having an rf carrier, a receiver portion having a circuit for receiving echo signals, and means for coupling the transmitter portion to and the receiver portion to an antenna means, the combination therewith of: a stable oscillator for generating a reference signal; means coupled to receive a portion of the transmitter signals and to receive the reference signal for detecting phase differences therebetween and for generating an error signal that is proportional to a function of the detected phase differences; means coupled to receive the error signal for storing the received error signal for a time period; and means coupled to receive the reference signal and to receive the stored error signal for phase shifting the reference signal in proportion to the error signal to remove phase variations in the reference signal relative to the transmitted signal whereby the reference signal is made coherent relative to each related echo signal.

4. In a radar circuit of the type including a transmitter portion for transmitting main bang pulses having an rf carrier, a receiver portion having a circuit for receiving echo signals, and means for connecting the transmitter portion and the receiver portion to an antenna means, the combination therewith of: a reference oscillator for generating a clock reference signal; means coupled to detect the transmitter signal and coupled to receive the reference signal for detecting phase differences therebetween and for generating an error signal that is proportional to a function of the detected phase differences; means coupled to receive the error signal for storing the received error signal during the interpulse period; and means coupled to receive the clock reference signal and to receive the stored error signal for phase shifting the clock reference signal in proportion to the error signal whereby the reference signal is phase corrected relative to the carrier phase variation of each transmitted pulse signal.

5. In a radar circuit of the type including a transmitter portion having rf oscillator means for generating and transmitting main bang pulses, and a receiver portion having a circuit for receiving and detecting echo signals, the combination therewith of: a stable oscillator for generating a reference signal; means coupled to receive a portion of the transmitter signal and coupled to receive the reference signal for detecting phase differences therebetween and for generating an error signal that is proportional to a function of the detected phase differences; means coupled to receive the error signal for storing the received error signal for an interpulse period; means coupled to receive the reference signal and to receive the stored error signal for phase shifting the reference signal in proportion to the error signal whereby the reference signal is phase shifted relative to each transmitted signal; and means coupled to receive the echo signal and the phase shifted reference signal for continually detecting the phase difference therebetween and for generating a coherent video signal.

6. In a radar circuit of the type including a transmitter section having a pulsed rf oscillator means for generating and transmitting pulses, a receiver section having a circuit for detecting echo signals, and means for connecting the transmitter section and the receiver section to an antenna means, the combination therewith of: a reference oscillator means for generating two clock reference signals in phase quadrature with one another; means coupled to receive a portion of the transmitted signals and coupled to receive the reference signals for detecting phase differences between the transmitted signal and the two phase quadrature reference signals and for generating error signals which are proportional to functions of the phase differences therebetween; and means coupled to receive the reference signal and to receive the error signal for phase shifting the reference signal in proportion to the error signal whereby the reference signal is phase corrected relative to each transmitted signal.

7. In a radar circuit of the type including a transmitter section having a pulsed rf oscillator means for generating and transmitting main bang pulses, a receiver section having a circuit for detecting echo signals, and means for connecting the transmitter section and the receiver section to an antenna means, the combination therewith of: a stable reference oscillator means for generating a reference signal; means coupled to receive a portion of the transmitter signals and coupled to receive the reference signal for detecting phase differences between the transmitter signal and the reference signal and for generating two in-phase quadrature error signals which are proportional to functions of the phase differences between the received signals; means coupled to receive the error signals for storing the received error signals during an interpulse period; and means coupled to receive the reference signal and to receive the error signals for phase shifting the reference signal in proportion to the error signal whereby the reference signal is coherent relative to each transmitted signal.

8. In a radar circuit of the type including a transmitter section having a pulsed rf oscillator, a receiver section having a circuit for detecting echo signals, and means for connecting the transmitter section and the receiver section to an antenna means, the combination therewith of: reference oscillator means for generating two c-w reference signals in phase quadrature with one another; means coupled to receive a portion of the transmitted signals and coupled to receive the reference signals for detecting phase differences between the transmitted signal and the two in-phase quadrature reference signals and for generating error signals which are proportional to the phase differences therebetween; means coupled to receive the reference signal and to receive the error signal for phase shifting the reference signal in proportion to the error signal whereby the reference signal is phase corrected relative to each transmitted signal; and means coupled to receive the echo signal and the phase shifted reference signal for continually phase detecting the difference therebetween for generating a coherent video signal output.

9. A radar circuit comprising: a transmitter means having an rf oscillator for generating and transmitting pulsed signals; a receiver means for detecting echo signals; a stable oscillator means for generating a c-w reference signal; means coupled to receive a portion of the transmitted signals and coupled to receive the reference signals for detecting phase differences therebetween and for generating an error signal that is proportional to the phase differences therebetween; means coupled to receive the error signal for storing the received error signal for a predetermined period of time; and means coupled to receive the c-w reference signal and to receive the error signal for phase shifting the reference signal in proportion to the error signal whereby the reference signal is phase corrected relative to each transmitted signal.

10. A radar circuit comprising: a transmitter means having an rf oscillator for generating and transmitting pulsed signals; a receiver means for detecting echo signals; an oscillator means for generating a c-w reference signal; means coupled to receive a portion of the transmitted signals and coupled to receive the reference signals for detecting phase differences therebetween and for generating an error signal that is proportional to the phase differences therebetween; means coupled to receive the error signal for holding the received error signal for an interpulse period; means coupled to receive the c-w reference signal and to receive the error signal for phase shifting the reference signal in proportion to the error signal whereby the reference signal is phase corrected relative to each transmitted signal; and means coupled to receive the echo signal and to receive the phase shifted reference signal for continually phase detecting the difference therebetween for generating a coherent video signal output.

11. In a radar circuit of the type including a transmitter section having an rf oscillator, a receiver section having a circuit for detecting echo signals, and means for connecting the transmitter section and the receiver section to an antenna means, the combination therewith of: an oscillator for generating an IF reference signal; means coupled to receive a portion of the transmitted signals at an IF level and coupled to receive the IF reference signal for detecting phase differences between the transmitted signal and the reference signal and for generating an error signal that is proportional to the phase differences therebetween; and means coupled to receive the IF reference signal and to receive the error signal for phase shifting the IF reference signal in proportion to the error signal whereby the IF reference signal is phase corrected relative to each transmitted signal.

12. In a radar circuit of the type including a transmitter portion having an rf oscillator, a receiver portion having a circuit for receiving and detecting echo signals, and means for connecting the transmitter portion and the receiver portion to an antenna means, the combination therewith of: an oscillator for generating an IF reference signal; means coupled to receive a portion of the transmitted signal at IF level and to receive the IF reference signal for detecting phase differences therebetween and for generating an error signal that is proportional to the phase differences; means coupled to receive the error signal for storing the received error signal for an interpulse period; and means coupled to receive the IF reference signal and to receive the stored error signal for phase shifting the IF reference signal in proportion to the error signal whereby the IF reference signal is phase corrected relative to each transmitted signal.

13. In a radar circuit of the type including a transmitter portion having a pulsed rf oscillator, a receiver portion having a circuit for receiving and detecting echo signals, and means for connecting the transmitter portion and the receiver portion to an antenna means, the combination therewith of: an oscillator for generating an IF reference signal; means coupled to the receiver portion of the transmitted signal at IF level and coupled to receive the IF reference signal for detecting phase differences therebetween and for generating an error signal that is proportional to the phase differences; means coupled to receive the IF reference signal and to receive the stored error signal for phase shifting the IF reference signal in proportion to the error signal whereby the IF reference signal is phase shifted relative to each transmitter signal; and means coupled to receive the echo signal at IF level and the phase shifted IF reference signal for continually detecting the phase difference therebetween and for generating a coherent video signal.

14. In a radar circuit of the type including a transmitter section having a pulsed rf oscillator, a receiver section having a circuit for detecting echo signals, and means for connecting the transmitter section and the receiver section to an antenna means, the combination therewith of: a reference oscillator means for generating two IF reference signals in quadrature with one another; means coupled to receive a portion of the transmitted signals at IF level and coupled to receive the IF reference signals for detecting phase differences between the transmitted signal and the two in-quadrature reference signals and for generating error signals which are proportional to the phase differences therebetween; and means coupled to receive the IF reference signal and to receive the error signal for phase shifting the IF reference signal in proportion to the error signal whereby the IF reference signal is phase corrected relative to each transmitted signal.

15. In a radar circuit of the type including a transmitter section having a pulsed rf oscillator, a receiver section having a circuit for detecting echo signals, and means for connecting the transmitter section and the receiver section to an antenna means, the combination therewith of: a reference oscillator means for generating two IF reference signals in quadrature with one another; means coupled to receive a portion of the transmitted signals at IF level and coupled to receive the IF reference signals for detecting phase differences between the transmitted signal and the two in-quadrature reference signals and for generating error signals which are proportional to the phase differences therebetween; means coupled to receive the error signal for storing the received error signal and for interpulse period; and means coupled to receive the IF reference signal and to receive the error signal for phase shifting the IF reference signal in proportion to the error signal whereby the IF reference signal is phase corrected relative to each transmitted signal.

16. In a radar circuit of the type including a transmitter section having a pulsed rf oscillator, a receiver section having a circuit for detecting echo signals, and means for connecting the transmitter section and the receiver section to an antenna means, the combination therewith of: reference oscillator means for generating two c-w IF reference signals in quadrature with one another; means coupled to receive a portion of the transmitted signals at IF level and coupled to receive the IF reference signals for detecting phase differences between the transmitted signal and the two in quadrature reference signals and for generating error signals which are proportional to the phase differences therebetween; means coupled to receive the IF reference signal and to receive the error signal for phase shifting the IF reference signal in proportion to the error signal whereby the IF reference signal is phase corrected relative to each transmitted signal; and means coupled to receive the echo signal at IF level and the phase shifted IF reference signal for continually phase detecting the difference therebetween for generating a coherent video signal output.

17. In a radar circuit of the type including a transmitter section having a pulsed rf oscillator, a receiver section having a circuit for detecting echo signals, and means for connecting the transmitter section and the receiver section to an antenna means, the combination therewith of: reference oscillator means for generating two c-w IF reference signals in quadrature with one another; means coupled to receive a portion of the transmitted signals at IF level and coupled to receive the IF reference signals for detecting phase differences between the transmitted signal and the two in quadrature reference signals and for generating error signals which are proportional to the phase differences therebetween; means coupled to receive the IF reference signal and to receive the error signal for phase shifting the IF reference signal in proportion to the error signal whereby the IF reference signal is phase corrected relative to each transmitted signal; means coupled to receive the error signal for storing the received error signal for an interpulse period; and means coupled to receive the echo signal at IF level and the phase shifted IF reference signal for continually phase detecting the difference therebetween for generating a coherent video signal output.

18. In a radar circuit of the type including a transmitted section having a circuit for generating and transmitting pulsed rf oscillatory signals, and a receiver section having a circuit for detecting echo signals, the combination therewith of: a means for generating a clock reference signal; means coupled to receive a portion of the pulsed rf oscillatory signals generated at the transmitter and coupled to receive the clock reference signal for detecting phase differences therebetween, and for generating an error signal that is proportional to a function of the detected phase differences; a stable local oscillator means in the receiver section for generating a c-w output signal; phase shifter means coupled to receive the stable local oscillator output signal and to receive the error signal for phase shifting the local oscillator output signal to remove phase variations in the local oscillator output signal relative to the transmitted signal resulting from rf starting phase variations in the transmitted pulses; and means for receiving the echo signals and for receiving the phase shifted local oscillator signals for producing a coherent echo signal.

19. In a radar circuit of the type including a transmitter section having a circuit for generating and transmitting pulsed rf oscillatory signals, a receiver section having a circuit for detecting echo signals, the combination therewith of: a means for generating a clock reference signal; means coupled to receive a portion of the pulsed rf oscillatory signals generated by the transmitter and coupled to receive the clock reference signal for detecting phase differences between the transmitted signal and the clock reference signal and for generating an error signal that is proportional to a function of the detected phase differences therebetween; means coupled to receive the error signal for storing the received error signal during the interpulsed period between transmitted pulse signals; a stable local oscillator means in the receiving section for generating a c-w output signal; phase shifter means coupled to receive the stable local oscillator output signal and to receive the error signal for phase shifting the local oscillator output signal to remove phase variations in the local oscillator output signal relative to the transmitted signal resulting from rf starting phase variations in the transmitted pulses; and means for receiving the echo signals and for receiving the phase shifted local oscillator signals for producing a coherent echo signal.

* * * * *